United States Patent
Vermani et al.

(10) Patent No.: US 11,146,980 B2
(45) Date of Patent: Oct. 12, 2021

(54) METHOD AND APPARATUS FOR SUPPORTING MODULATION-CODING SCHEME SET IN VERY HIGH THROUGHPUT WIRELESS SYSTEMS

(71) Applicant: QUALCOMM Incorporated, San Diego, CA (US)

(72) Inventors: Sameer Vermani, San Diego, CA (US); Santosh Paul Abraham, San Diego, CA (US)

(73) Assignee: QUALCOMM INCORPORATED, San Diego, CA (US)

(*) Notice: Subject to any disclaimer, the term of this patent is extended or adjusted under 35 U.S.C. 154(b) by 903 days.

(21) Appl. No.: 14/559,383

(22) Filed: Dec. 3, 2014

(65) Prior Publication Data

US 2015/0085653 A1   Mar. 26, 2015

Related U.S. Application Data

(62) Division of application No. 13/327,560, filed on Dec. 15, 2011, now Pat. No. 8,934,466.

(60) Provisional application No. 61/423,924, filed on Dec. 16, 2010.

(51) Int. Cl.
    *H04W 28/02* (2009.01)
    *H04L 1/00* (2006.01)
    *H04L 1/06* (2006.01)

(52) U.S. Cl.
    CPC ....... *H04W 28/0215* (2013.01); *H04L 1/0003* (2013.01); *H04L 1/005* (2013.01); *H04L 1/0009* (2013.01); *H04L 1/0028* (2013.01); *H04L 1/06* (2013.01)

(58) Field of Classification Search
    CPC ... H04L 1/0009; H04L 1/0025; H04L 1/0021; H04L 1/0003; H04B 7/0619; H04W 24/02; H04W 52/262
    See application file for complete search history.

(56) References Cited

U.S. PATENT DOCUMENTS

| | | |
|---|---|---|
| 8,179,775 B2 | 5/2012 | Chen et al. |
| 8,295,384 B2 | 10/2012 | Stager et al. |
| 8,665,906 B1 | 3/2014 | Liu et al. |
| 8,665,908 B1 | 3/2014 | Zhang et al. |
| 8,724,720 B2 | 5/2014 | Srinivasa et al. |
| 8,787,341 B2 | 7/2014 | Sohn et al. |
| 9,161,362 B1 | 10/2015 | Banerjea et al. |
| 2006/0182017 A1 | 8/2006 | Hansen et al. |

(Continued)

FOREIGN PATENT DOCUMENTS

| | | |
|---|---|---|
| CN | 101627589 A | 1/2010 |
| EP | 2194661 A1 | 6/2010 |

(Continued)

OTHER PUBLICATIONS

3GPP TSG-RAN WG1#17, Adaptive Modulation and Coding (AMC), Oct. 2000 (Year: 2000).*

(Continued)

*Primary Examiner* — Un C Cho
*Assistant Examiner* — Peter K Mak
(74) *Attorney, Agent, or Firm* — Patterson+Sheridan, L.L.P.

(57) ABSTRACT

Certain aspects of the present disclosure relate to techniques for designing Modulation-Coding Scheme (MSC) set fields in a transmission frame of Very High Throughput (VHT) wireless systems.

42 Claims, 12 Drawing Sheets

(56) References Cited

U.S. PATENT DOCUMENTS

| | | |
|---|---|---|
| 2006/0268976 A1 | 11/2006 | Baum et al. |
| 2007/0008943 A1 | 1/2007 | Grant et al. |
| 2007/0183529 A1* | 8/2007 | Tujkovic .............. H04B 7/0413 375/267 |
| 2007/0206695 A1* | 9/2007 | Ye ....................... H04L 27/2608 375/267 |
| 2008/0013505 A1 | 1/2008 | Trainin |
| 2008/0043677 A1* | 2/2008 | Kim ...................... H04B 7/0634 370/332 |
| 2008/0057972 A1* | 3/2008 | Doettling .......... H04W 72/1289 455/450 |
| 2008/0107193 A1 | 5/2008 | Erceg et al. |
| 2008/0153425 A1* | 6/2008 | Heo ....................... H04L 1/0004 455/68 |
| 2008/0258981 A1* | 10/2008 | Achour ................ H01Q 21/065 343/702 |
| 2009/0116589 A1 | 5/2009 | Zhang et al. |
| 2009/0323608 A1 | 12/2009 | Adachi et al. |
| 2010/0202370 A1 | 8/2010 | Liao et al. |
| 2011/0096797 A1* | 4/2011 | Zhang ................... H04W 84/12 370/474 |
| 2011/0149812 A1* | 6/2011 | Bonta ............... H04W 72/1268 370/277 |
| 2011/0243208 A1 | 10/2011 | Shany et al. |
| 2011/0255620 A1 | 10/2011 | Jones, IV et al. |
| 2011/0273977 A1 | 11/2011 | Shapira et al. |
| 2011/0287790 A1 | 11/2011 | Haustein et al. |
| 2012/0076219 A1* | 3/2012 | Srinivasa ............. H04L 1/0033 375/260 |
| 2012/0087426 A1 | 4/2012 | Zhang et al. |
| 2012/0155447 A1 | 6/2012 | Vermani et al. |
| 2012/0176982 A1* | 7/2012 | Zirwas ................. H04L 27/261 370/329 |
| 2013/0021960 A1* | 1/2013 | Lee .................... H04W 52/0216 370/311 |

FOREIGN PATENT DOCUMENTS

| | | |
|---|---|---|
| JP | 2008517550 A | 5/2008 |
| JP | 2008543164 A | 11/2008 |
| JP | 2010011397 A | 1/2010 |
| JP | 2013509105 A | 3/2013 |
| RU | 2158490 C2 | 10/2000 |
| WO | WO-9629834 A1 | 9/1996 |
| WO | WO-1998019481 | 5/1998 |
| WO | WO-2006043242 A1 | 4/2006 |
| WO | WO-2006126954 A1 | 11/2006 |
| WO | WO-2010068065 A2 | 6/2010 |
| WO | WO-2011050320 A1 | 4/2011 |

OTHER PUBLICATIONS

IEEE Xplore, Energy Efficiency Opportunity at Same Data Rate and Different MCS in IEEE (Year: 2010).*
IEEE 802.11-10-1361-03-00ac, proposed tgac draft amendment (Year: 2011).*
IEEE 802.11-09-0992-18-00ac, proposed specification framework for tgac (Year: 2010).*
IEEE P802.11n/D11.0 Draft Standard for Information Technology, Part 11: Wireless LAN Medium Access Contol (MAC) and Physical Layer (PHY) specifications: Amendment 5 : Enhancements for Higher Throughput, Jun. 2009.
International Search Report and Written Opinion—PCT/US2011/065626—ISA/EPO—dated May 25, 2012.
Partial International Search Report—PCT/US2011/065626—ISA/EPO—dated Apr. 2, 2012.
QUALCOMM: "VHT Supported MCS Field", mentor.ieee.orgieee 802.11 TGac, No. IEEE 802.11-11/0026r0, Jan. 17, 2011 (Jan. 17, 2011), Jan. 17, 2011 (Jan. 17, 2011), pp. 1-9, XP002671953, Retrieved from the Internet: URL:https://mentor.ieee.org/802.11/documents"n=10&is_group=00ac&is_year=2011 [retrieved-on Mar. 20, 2012].
Jensen T.L., et al., "Fast Link Adaptation for MIMO-OFDM", IEEE Transactions on Vehicular Technology, vol. 59, No. 8, 2010, pp. 3766-3778, DOI: 10.1109/TVT.2010.2053727.
Peng F., et al., "Adaptive Modulation and Coding for IEEE 802.11n", IEEE, Wireless Communications and Networking Conference (WCNC), 2007, pp. 657-662.
Stacey R., et al., "Specification Framework for TGac", IEEE 802.11-09/0992r18, Sep. 16, 2010, pp. 1-44.
Syafei W.A., et al., "A Design of Next Generation Gigabit MIMO Wireless LAN system", Advanced Communication Technology (ICACT), 2010 the 12th International Conference on, IEEE, Piscataway, NJ, USA, Feb. 7, 2010, pp. 941-946, XP031653679, ISBN: 978-1-4244-5427-3.
Zhou X., et al., "Correlation based Rate Adaptation via Insights from Incompiete Observations in 802.11 Networks", IEEE International Conference on Communications, 2007, pp. 1-6.
European Search Report—EP19180312—Search Authority—Munich—dated Oct. 22, 2019.
IEEE 802.11: "IEEE 802.11-10/1361 r3 Proposed TGac Draft Amendment", Jan. 18, 2011 (Jan. 18, 2011), XP055039973, Retrieved from the Internet: URL: https://mentor.ieee.org [retrieved on Oct. 4, 2012] pp. 33-34, Chapter 7.3.2.61.4, Figures 7-8 and 7-9 and Table 7-18.

* cited by examiner

METHOD AND APPARATUS FOR SUPPORTING MODULATION-CODING SCHEME SET IN VERY HIGH THROUGHPUT WIRELESS SYSTEMS

CROSS REFERENCE TO RELATED APPLICATIONS

The present application is a divisional application of application Ser. No. 13/327,560, filed Dec. 15, 2011, which claims the benefit of U.S. Provisional Patent Application Ser. No. 61/423,924, entitled, "Supported modulation-coding scheme for Very High Throughput wireless systems", filed Dec. 16, 2010, both assigned to the assignee hereof and hereby expressly incorporated by reference herein.

BACKGROUND

Field

Certain aspects of the present disclosure generally relate to wireless communications and, more particularly, to a method and apparatus for designing Modulation-Coding Scheme (MSC) set field in a frame transmitted in Very High Throughput (VHT) wireless systems.

Background

In order to address the issue of increasing bandwidth requirements that are demanded for wireless communication systems, different schemes are being developed to allow multiple user terminals to communicate with a single access point (AP) by sharing the channel resources while achieving high data throughputs. Multiple Input Multiple Output (MIMO) technology represents one such approach that has recently emerged as a popular technique for the next generation communication systems. MIMO technology has been adopted in several emerging wireless communications standards such as the Institute of Electrical and Electronics Engineers (IEEE) 802.11 standard. The IEEE 802.11 denotes a set of Wireless Local Area Network (WLAN) air interface standards developed by the IEEE 802.11 committee for short-range communications (e.g., tens of meters to a few hundred meters).

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

In wireless networks with a single AP and multiple user stations (STAs), concurrent transmissions may occur on multiple channels toward different STAs, both in uplink and downlink directions. Many challenges are present in such systems. For example, the AP may transmit signals using different standards such as the IEEE 802.11n/a/b/g or the IEEE 802.11ac (Very High Throughput (VHT)) standards. A receiver STA may be able to detect a transmission mode of the signal based on information included in a preamble of the transmission packet.

A downlink multi-user MIMO (MU-MIMO) system based on Spatial Division Multiple Access (SDMA) transmission can simultaneously serve a plurality of spatially separated STAs by applying beamforming at the AP's antenna array. Complex transmit precoding weights can be calculated by the AP based on channel state information (CSI) received from each of the supported STAs.

SUMMARY

Certain aspects of the present disclosure provide a method for wireless communications. The method generally includes constructing, at an apparatus, a frame comprising a first indication about a plurality of modulation-coding schemes (MCSs) supported by the apparatus for receiving a corresponding different number of spatial streams (SSs), and transmitting the frame.

Certain aspects of the present disclosure provide an apparatus for wireless communications. The apparatus generally includes a circuit configured to construct a frame comprising a first indication about a plurality of modulation-coding schemes (MCSs) supported by the apparatus for receiving a corresponding different number of spatial streams (SSs), and a transmitter configured to transmit the frame.

Certain aspects of the present disclosure provide an apparatus for wireless communications. The apparatus generally includes means for construct a frame comprising a first indication about a plurality of modulation-coding schemes (MCSs) supported by the apparatus for receiving a corresponding different number of spatial streams (SSs), and means for transmitting the frame.

Certain aspects provide a computer-program product for wireless communications. The computer-program product includes a computer-readable medium comprising instructions executable for constructing, at an apparatus, a frame comprising a first indication about a plurality of modulation-coding schemes (MCSs) supported by the apparatus for receiving a corresponding different number of spatial streams (SSs), and transmitting the frame.

Certain aspects of the present disclosure provide a method for wireless communications. The method generally includes constructing, at an apparatus, a frame comprising a first indication about a plurality of modulation-coding schemes (MCSs) supported by the apparatus for receiving a corresponding different number of spatial streams (SSs), and transmitting the frame, wherein the first indication comprises a value for each of a plurality of bandwidths, and the value represents a highest MCS among the MCSs supported for reception by the apparatus for that bandwidth.

Certain aspects of the present disclosure provide an apparatus for wireless communications. The apparatus generally includes a circuit configured to construct a frame comprising a first indication about a plurality of modulation-coding schemes (MCSs) supported by the apparatus for receiving a corresponding different number of spatial streams (SSs), and a transmitter configured to transmit the frame, wherein the first indication comprises a value for each of a plurality of bandwidths, and the value represents a highest MCS among the MCSs supported for reception by the apparatus for that bandwidth.

Certain aspects of the present disclosure provide an apparatus for wireless communications. The apparatus generally includes means for constructing a frame comprising a first indication about a plurality of modulation-coding schemes (MCSs) supported by the apparatus for receiving a corresponding different number of spatial streams (SSs), and means for transmitting the frame, wherein the first indication comprises a value for each of a plurality of bandwidths, and the value represents a highest MCS among the MCSs supported for reception by the apparatus for that bandwidth.

Certain aspects provide a computer-program product for wireless communications. The computer-program product includes a computer-readable medium comprising instructions executable for constructing, at an apparatus, a frame comprising a first indication about a plurality of modulation-coding schemes (MCSs) supported by the apparatus for receiving a corresponding different number of spatial streams (SSs), and transmitting the frame, wherein the first indication comprises a value for each of a plurality of bandwidths, and the value represents a highest MCS among the MCSs supported for reception by the apparatus for that bandwidth.

Certain aspects of the present disclosure provide a method for wireless communications. The method generally includes receiving, at an apparatus from another apparatus, a frame comprising a first indication about a plurality of modulation-coding schemes (MCSs) supported by the other apparatus for receiving a corresponding different number of spatial streams (SSs), and selecting a rate for communication to the other apparatus based at least in part on the first indication.

Certain aspects of the present disclosure provide an apparatus for wireless communications. The apparatus generally includes a receiver configured to receive, from another apparatus, a frame comprising a first indication about a plurality of modulation-coding schemes (MCSs) supported by the other apparatus for receiving a corresponding different number of spatial streams (SSs), and a circuit configured to select a rate for communication to the other apparatus based at least in part on the first indication.

Certain aspects of the present disclosure provide an apparatus for wireless communications. The apparatus generally includes means for receiving, from another apparatus, a frame comprising a first indication about a plurality of modulation-coding schemes (MCSs) supported by the other apparatus for receiving a corresponding different number of spatial streams (SSs), and means for selecting a rate for communication to the other apparatus based at least in part on the first indication.

Certain aspects provide a computer-program product for wireless communications. The computer-program product includes a computer-readable medium comprising instructions executable for receiving, at an apparatus from another apparatus, a frame comprising a first indication about a plurality of modulation-coding schemes (MCSs) supported by the other apparatus for receiving a corresponding different number of spatial streams (SSs), and selecting a rate for communication to the other apparatus based at least in part on the first indication.

Certain aspects of the present disclosure provide a method for wireless communications. The method generally includes receiving, at an apparatus from another apparatus, a frame comprising a first indication about a plurality of modulation-coding schemes (MCSs) supported by the other apparatus for receiving a corresponding different number of spatial streams (SSs), and selecting a rate for communication to the other apparatus based at least in part on the first indication, wherein the first indication comprises a value for each of a plurality of bandwidths, and the value represents a highest MCS among the MCSs supported for reception by the other apparatus for that bandwidth.

Certain aspects of the present disclosure provide an apparatus for wireless communications. The apparatus generally includes a receiver configured to receive, from another apparatus, a frame comprising a first indication about a plurality of modulation-coding schemes (MCSs) supported by the other apparatus for receiving a corresponding different number of spatial streams (SSs), and a circuit configured to select a rate for communication to the other apparatus based at least in part on the first indication, wherein the first indication comprises a value for each of a plurality of bandwidths, and the value represents a highest MCS among the MCSs supported for reception by the other apparatus for that bandwidth.

Certain aspects of the present disclosure provide an apparatus for wireless communications. The apparatus generally includes means for receiving, from another apparatus, a frame comprising a first indication about a plurality of modulation-coding schemes (MCSs) supported by the other apparatus for receiving a corresponding different number of spatial streams (SSs), and means for selecting a rate for communication to the other apparatus based at least in part on the first indication, wherein the first indication comprises a value for each of a plurality of bandwidths, and the value represents a highest MCS among the MCSs supported for reception by the other apparatus for that bandwidth.

Certain aspects provide a computer-program product for wireless communications. The computer-program product includes a computer-readable medium comprising instructions executable for receiving, at an apparatus from another apparatus, a frame comprising a first indication about a plurality of modulation-coding schemes (MCSs) supported by the other apparatus for receiving a corresponding different number of spatial streams (SSs), and selecting a rate for communication to the other apparatus based at least in part on the first indication, wherein the first indication comprises a value for each of a plurality of bandwidths, and the value represents a highest MCS among the MCSs supported for reception by the other apparatus for that bandwidth.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
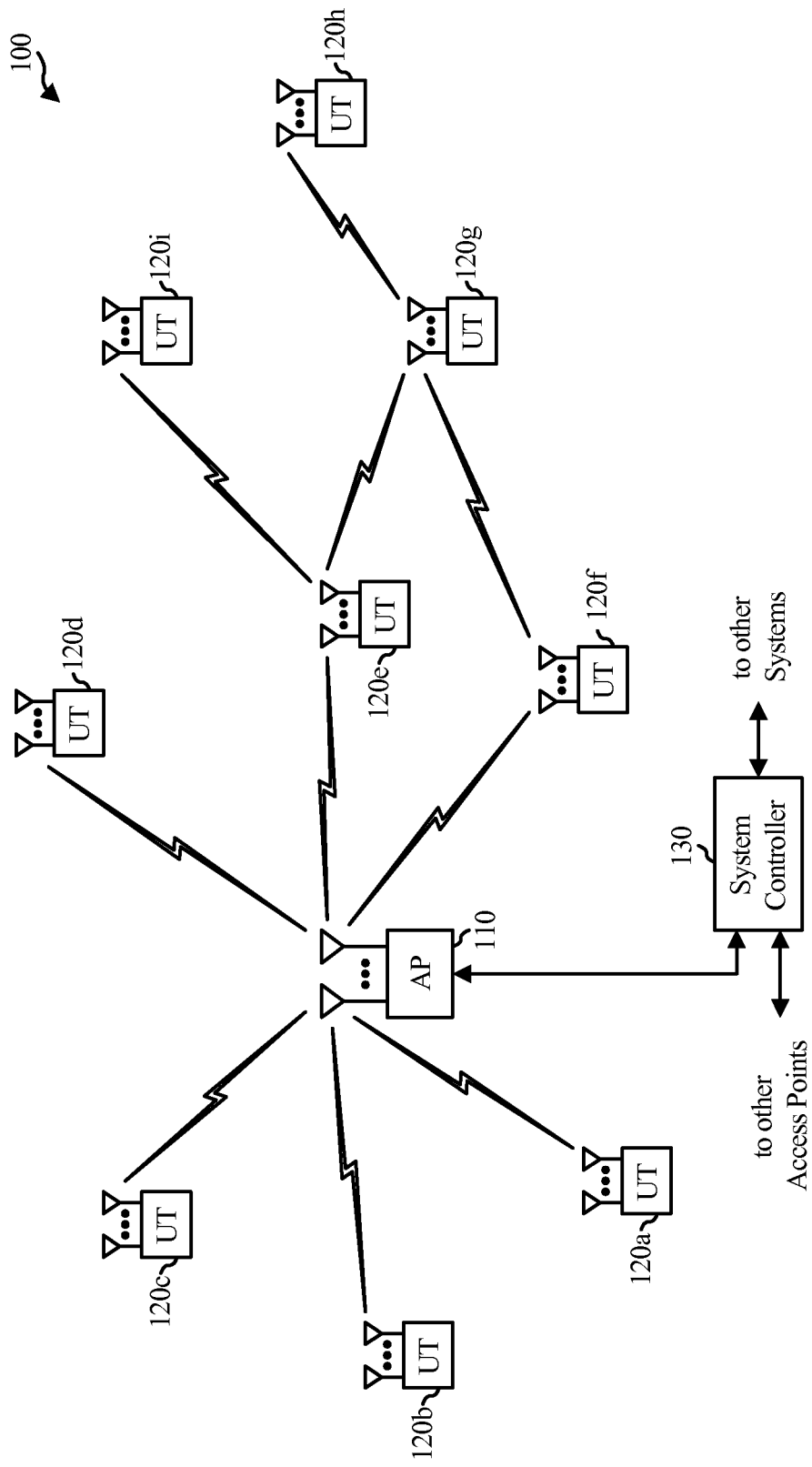
FIG. 1 illustrates a wireless communications network in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on a single carrier transmission. Aspects disclosed herein may be, for example, advantageous to systems employing Ultra Wide Band (UWB) signals including millimeter-wave signals. However, the present disclosure is not intended to be limited to such systems, as other coded signals may benefit from similar advantages.

The teachings herein may be incorporated into (e.g., implemented within or performed by) a variety of wired or wireless apparatuses (e.g., nodes). In some aspects a node comprises a wireless node. Such wireless node may provide, for example, connectivity for or to a network (e.g., a wide area network such as the Internet or a cellular network) via a wired or wireless communication link. In some aspects, a wireless node implemented in accordance with the teachings herein may comprise an access point or an access terminal.

An access point ("AP") may comprise, be implemented as, or known as NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology. In some implementations an access point may comprise a set top box kiosk, a media center, or any other suitable device that is configured to communicate via a wireless or wired medium. According to certain aspects of the present disclosure, the access point may operate in accordance with the Institute of Electrical and Electronics Engineers (IEEE) 802.11 family of wireless communications standards.

An access terminal ("AT") may comprise, be implemented as, or known as an access terminal, a subscriber station, a subscriber unit, a mobile station, a remote station, a remote terminal, a user terminal, a user agent, a user device, user equipment, a user station, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), a tablet, an entertainment device (e.g., a music or video device, or a satellite radio), a television display, a flip-cam, a security video camera, a digital video recorder (DVR), a global positioning system device, or any other suitable device that is configured to communicate via a wireless or wired medium. According to certain aspects of the present disclosure, the access terminal may operate in accordance with the IEEE 802.11 family of wireless communications standards.

FIG. 1 illustrates a multiple-access MIMO system 100 with access points and user terminals. For simplicity, only one access point 110 is shown in FIG. 1. An access point (AP) is generally a fixed station that communicates with the user terminals and may also be referred to as a base station or some other terminology. A user terminal may be fixed or mobile and may also be referred to as a mobile station, a station (STA), a client, a wireless device, or some other terminology. A user terminal may be a wireless device, such as a cellular phone, a personal digital assistant (PDA), a handheld device, a wireless modem, a laptop computer, a personal computer, etc.

Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

System 100 employs multiple transmit and multiple receive antennas for data transmission on the downlink and uplink. Access point 110 is equipped with a number $N_{ap}$ of antennas and represents the multiple-input (MI) for downlink transmissions and the multiple-output (MO) for uplink transmissions. A set $N_u$ of selected user terminals 120 collectively represents the multiple-output for downlink transmissions and the multiple-input for uplink transmissions. In certain cases, it may be desirable to have $N_{ap} \geq N_u \geq 1$ if the data symbol streams for the $N_u$ user terminals are not multiplexed in code, frequency or time by some means. $N_u$ may be greater than $N_{ap}$ if the data symbol streams can be multiplexed using different code channels with CDMA, disjoint sets of sub-bands with OFDM, and so on. Each selected user terminal transmits user-specific data to and/or receives user-specific data from the access point. In general, each selected user terminal may be equipped with one or multiple antennas (i.e., $N_{ut} \geq 1$). The $N_u$ selected user terminals can have the same or different number of antennas.

MIMO system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). MIMO system 100 may represent a high speed Wireless Local Area Network (WLAN) operating in a 60 GHz band.

Figure 2:
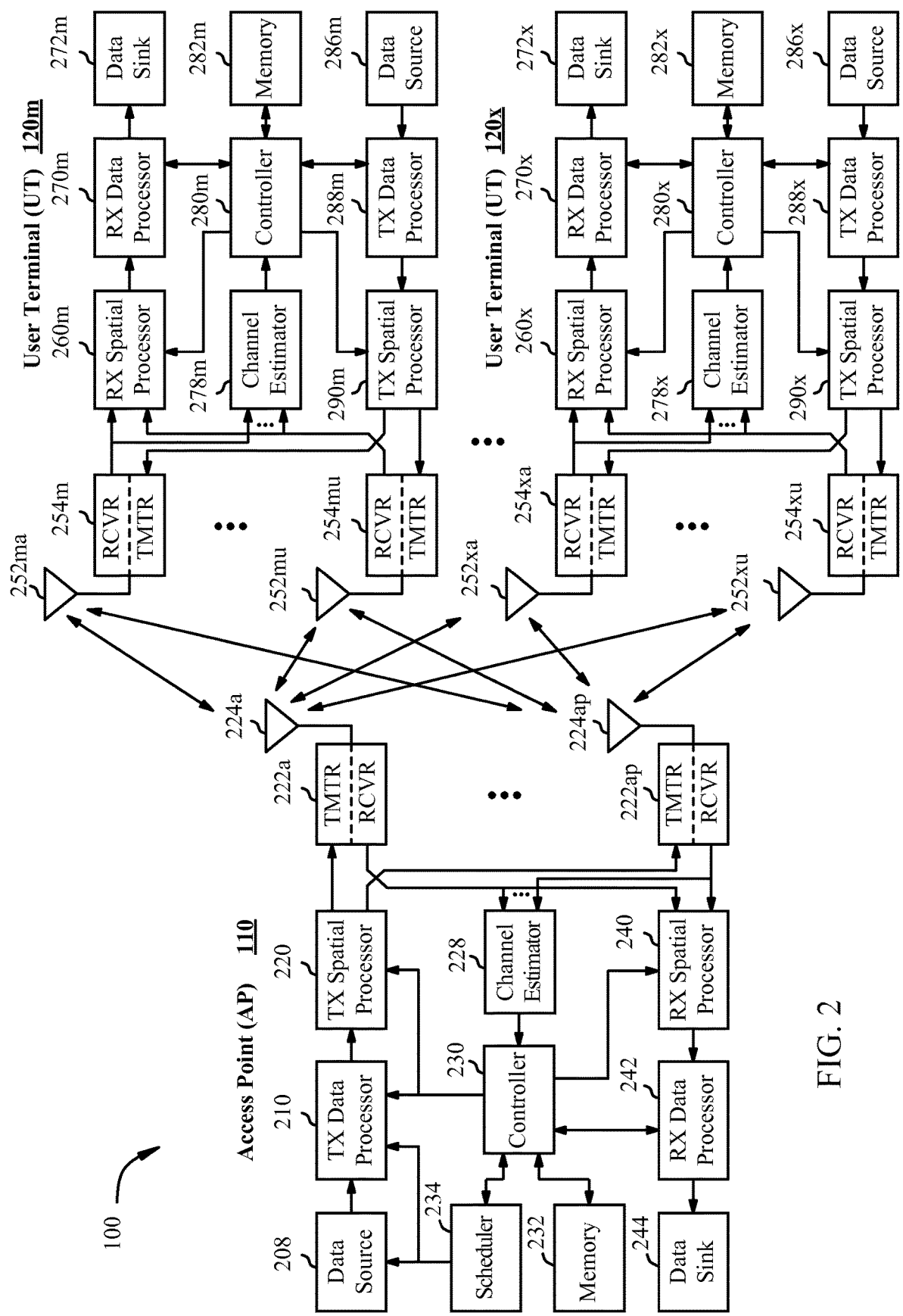
FIG. 2 illustrates a block diagram of an example access point and user terminals in accordance with certain aspects of the present disclosure.

FIG. 2 shows a block diagram of access point 110 and two user terminals 120m and 120x in MIMO system 100. Access point 110 is equipped with $N_{ap}$ antennas 224a through 224ap. User terminal 120m is equipped with $N_{ut,m}$ antennas 252ma through 252mu, and user terminal 120x is equipped with $N_{ut,x}$ antennas 252xa through 252xu. Access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a frequency channel, and a "receiving entity" is an independently operated apparatus or device capable of receiving data via a frequency channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data $\{d_{up,m}\}$ for the user terminal based on the coding and modulation schemes associated with the rate selected for the user terminal and provides a data symbol stream $\{s_{up,m}\}$. A TX spatial processor 290 performs spatial processing on the data symbol stream $\{s_{up,m}\}$ and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point 110.

A number $N_{up}$ of user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), successive interference cancellation (SIC), or some other technique. Each recovered uplink data symbol stream $\{\hat{s}_{up,m}\}$ is an estimate of a data symbol stream $\{s_{up,m}\}$ transmitted by a respective user terminal. An RX data processor 242 processes (e.g., demodulates, deinterleaves, and decodes) each recovered uplink data symbol stream $\{\hat{s}_{up,m}\}$ in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal TX data processor 210 provides $N_{dn}$ downlink data symbol streams for the $N_{dn}$ user terminals. A TX spatial processor 220 performs spatial processing on the $N_{dn}$ downlink data symbol streams, and provides $N_{ap}$ transmit symbol streams for the $N_{ap}$ antennas. Each transmitter unit (TMTR) 222 receives and processes a respective transmit symbol stream to generate a downlink signal. $N_{ap}$ transmitter units 222 provide $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit (RCVR) 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream $\{\hat{s}_{dn,m}\}$ for the user terminal. The receiver spatial processing is performed in accordance with the CCMI, MMSE, or some other technique. An RX data processor 270 processes (e.g., demodulates, deinterleaves, and decodes) the recovered downlink data symbol stream to obtain decoded data for the user terminal.

At each user terminal 120, $N_{ut,m}$ antennas 252 receive the $N_{ap}$ downlink signals from access point 110. Each receiver unit (RCVR) 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream $\{s_{dn,m}\}$ for the user terminal. The receiver spatial processing is performed in accordance with the CCMI, MMSE, or some other technique. An RX data processor 270 processes (e.g., demodulates, deinterleaves, and decodes) the recovered downlink data symbol stream to obtain decoded data for the user terminal.

Certain aspects of the present disclosure support constructing, at the AP 110 (e.g., by the TX data processor 210), a frame with a first indication about a plurality of modulation-coding schemes (MCSs) supported by the AP 110 for receiving a corresponding different number of spatial streams (SSs) (e.g., from the user terminals 120). The transmitter 222 of the AP 110 may be configured to transmit the constructed frame to one or more of the user terminals 120.

Certain aspects of the present disclosure support receiving, from the AP 110 at the user terminal 120 using the receiver 254, a frame with a first indication about a plurality of MCSs supported by the AP 110 for receiving a corresponding different number of SSs. The user terminal 120 (e.g., the RX data processor 270) may be configured to select a rate for communication to the AP 110 based at least in part on the first indication.

Figure 3:
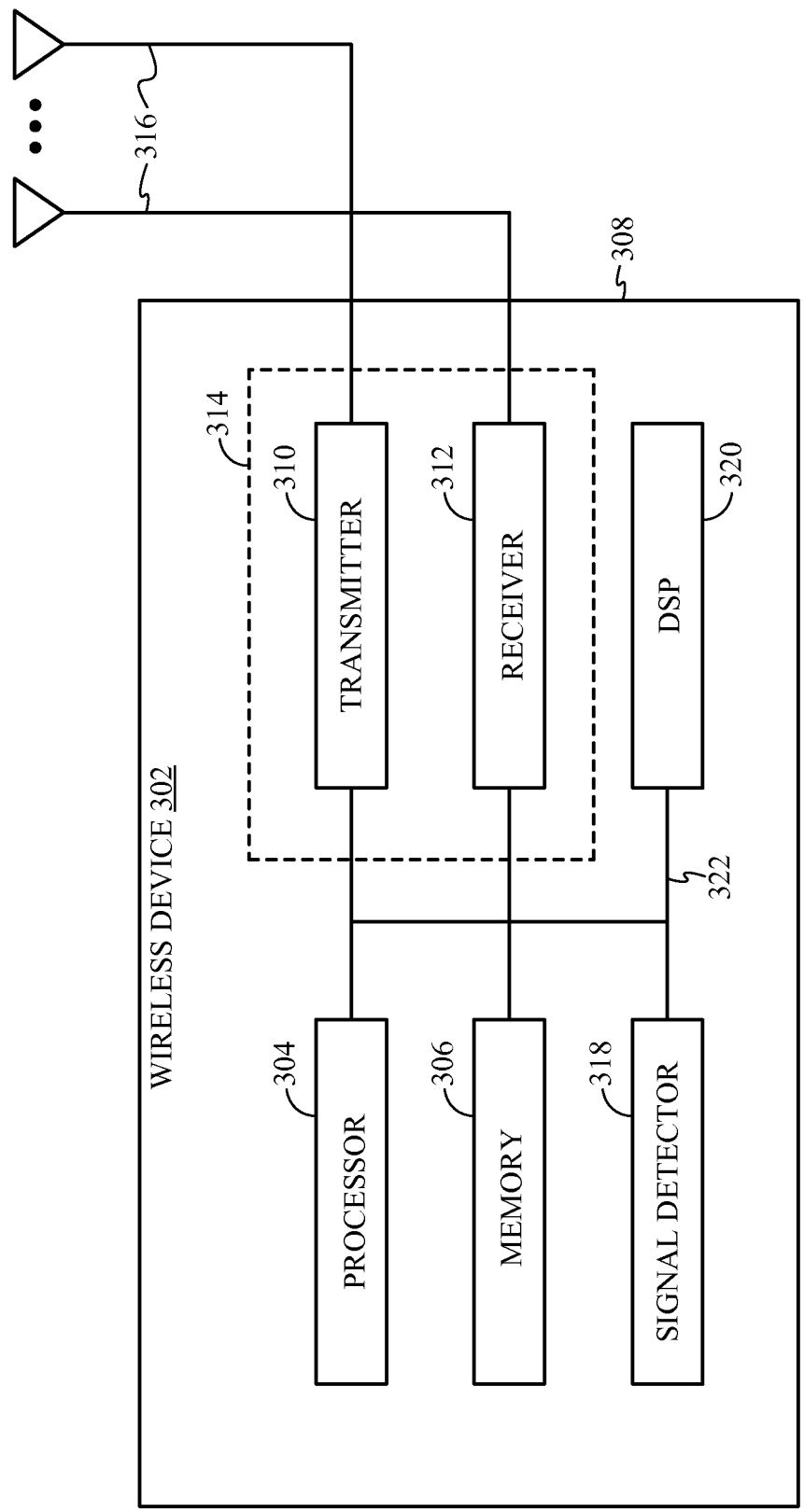
FIG. 3 illustrates a block diagram of an example wireless device in accordance with certain aspects of the present disclosure.

FIG. 3 illustrates various components that may be utilized in a wireless device 302 that may be employed within the system 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Certain aspects of the present disclosure support constructing, at the wireless device 302 (e.g., by the processor 304), a frame with a first indication about a plurality of MCSs supported by the wireless device 302 for receiving a corresponding different number of SSs (e.g., from user terminals). The transmitter 310 of the wireless device 302 may be configured to transmit the constructed frame to one or more of the user terminals.

Certain aspects of the present disclosure support receiving, at the wireless device 302 using the receiver 312, a frame with a first indication about a plurality of MCSs supported by the wireless device 302 for receiving a corresponding different number of SSs. The wireless device 302 (e.g., the processor 304) may be configured to select a rate for communication to an access point serving the wireless device 302 based at least in part on the first indication.

According to certain aspects of the present disclosure, it may be required to provide transmit and receive support for Modulation Coding Schemes (MCSs) 0 through 7 in a single stream of 20 MHz, 40 MHz and 80 MHz Physical layer convergence procedure Protocol Data Units (PPDUs) with 800 ns Guard Interval (GI) for both access points (APs) and user stations (STAs), such as the APs and user STAs from FIGS. 1-2. Further, it may be possible to provide receive support for 400 ns GI, support for operation in 160 MHz channel bandwidth, support for MCSs of 8 and 9, and support for more than one spatial stream.

Certain aspects of the present disclosure support designing "the MCS set field" indicating which MCSs (e.g., combination of MCS, number of spatial streams (Nss), and bandwidth (BW)) a STA may support for IEEE 802.11ac wireless communications standard. In IEEE 802.11n, an MCS can be identified by an MCS index, which may be represented by an integer in the range 0 to 76 (which may include different Nss possibilities). In IEEE 802.11ac, MCS and Nss can be disjoint quantities, and hence a new design is desired. Moreover, since unequal modulation may not be possible, the supported MCS set field may be compressed. The new MCS field may provide enough flexibility for implementation, while leaving as little room for ambiguity as possible while maintaining a low overhead.

Figure 4:
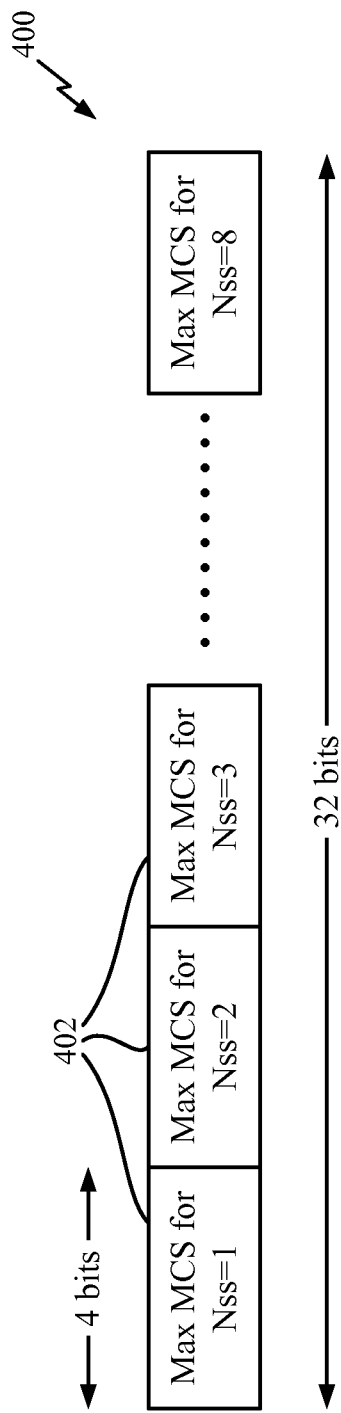
FIG. 4 illustrates an example receiving modulation-coding scheme (MCS) map in accordance with certain aspects of the present disclosure.

Content of Very High Throughput (VHT) Supported Modulation-Coding Scheme (MCS) Field FIG. 4 illustrates an example format 400 of receiver modulation-coding scheme (Rx MCS) map in accordance with certain aspects of the present disclosure. The Rx MCS map 400 may be a part of VHT supported MCS field of a transmission frame. In an aspect, the Rx MCS map 400 may comprise a 32-bit field, which may specify a maximum MCS supported for each number of spatial streams (Nss) received at a STA transmitting the Rx MCS map 400.

A field 402 may comprise a 4-bit number between 0 and 9 for each Nss value. In an aspect, binary value of '1111' in one the fields 402 may denote no support for that Nss. If MCS number n is supported for a given Nss value, all MCS's m smaller than or equal to the value of n may be also supported for that Nss, if the value of m is not a restricted MCS for that Nss.

Following the Rx MCS map field 400, 'Rx Highest Supported Data Rate' field may be defined. This field may be required to place a limit on a highest data rate supported for reception by the STA. The 'Rx Highest Supported Data Rate' field may comprise 13 bits, and the supported data rate may be in units of 1 Mb/s, where the binary value of '0000000000001' represents supported data rate for reception of 1 Mb/s, while incrementing of the binary value may correspond to increasing the supported reception data rate in steps of 1 Mb/s.

The VHT supported MCS field may further comprise a transmitter (Tx) MCS Set Defined bit. This bit may specify whether the transmitting STA is advertising its transmitting MCS capability or not. In an aspect of the present disclosure, subsequent fields may be irrelevant if this bit is set to zero. When this bit is set to one, the subsequent fields may help the STA in choosing a more powerful access point (AP) or an AP more commensurate with STA's own capability.

A Tx MCS map may follow the 'Tx MCS Set Defined' bit. In an aspect of the present disclosure, the Tx MCS map may be identical to the Rx MCS map 400 illustrated in FIG. 4.

Further, a 'Tx Highest Supported Data Rate' field may follow the Tx MCS map. This field may be required to advertise a maximum data rate that the STA may utilize for transmission. The 'Tx Highest Supported Data Rate' field may comprise 13 bits, and the supported transmission data rate may be in units of 1 Mb/s, where the binary value of '0000000000001' represents supported transmission data rate of 1 Mb/s, while incrementing of the binary value may correspond to increasing the transmission data rate in steps of 1 Mb/s.

Figure 5:
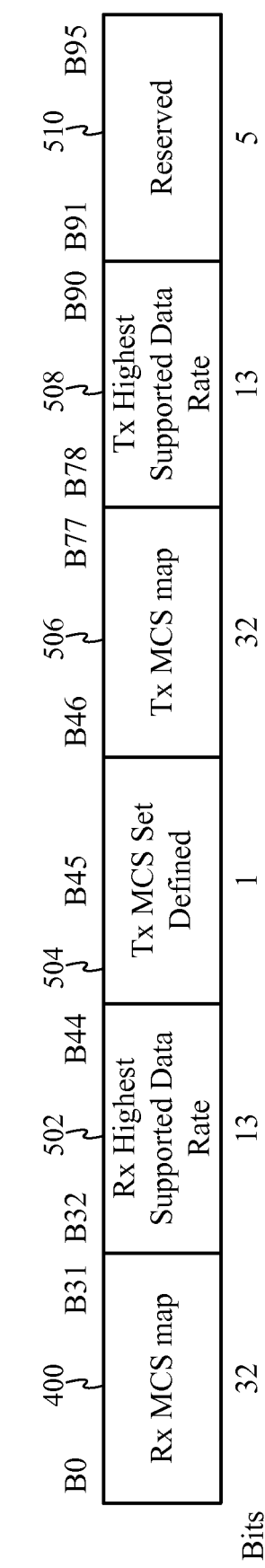
FIG. 5 illustrates an example frame format for Very High Throughput (VHT) supported MCS in accordance with certain aspects of the present disclosure.

FIG. 5 illustrates an example frame format 500 for VHT supported MCS in accordance with certain aspects of the present disclosure. As aforementioned, the frame 500 may comprise at least one of the Rx MCS map 400 from FIG. 4, the Rx Highest Supported Data Rate field 502, the Tx MCS Set Defined bit 504, the Tx MCS Map field 506, the Tx Highest Supported Data Rate 508, or reserved bits 510.

Figure 6:
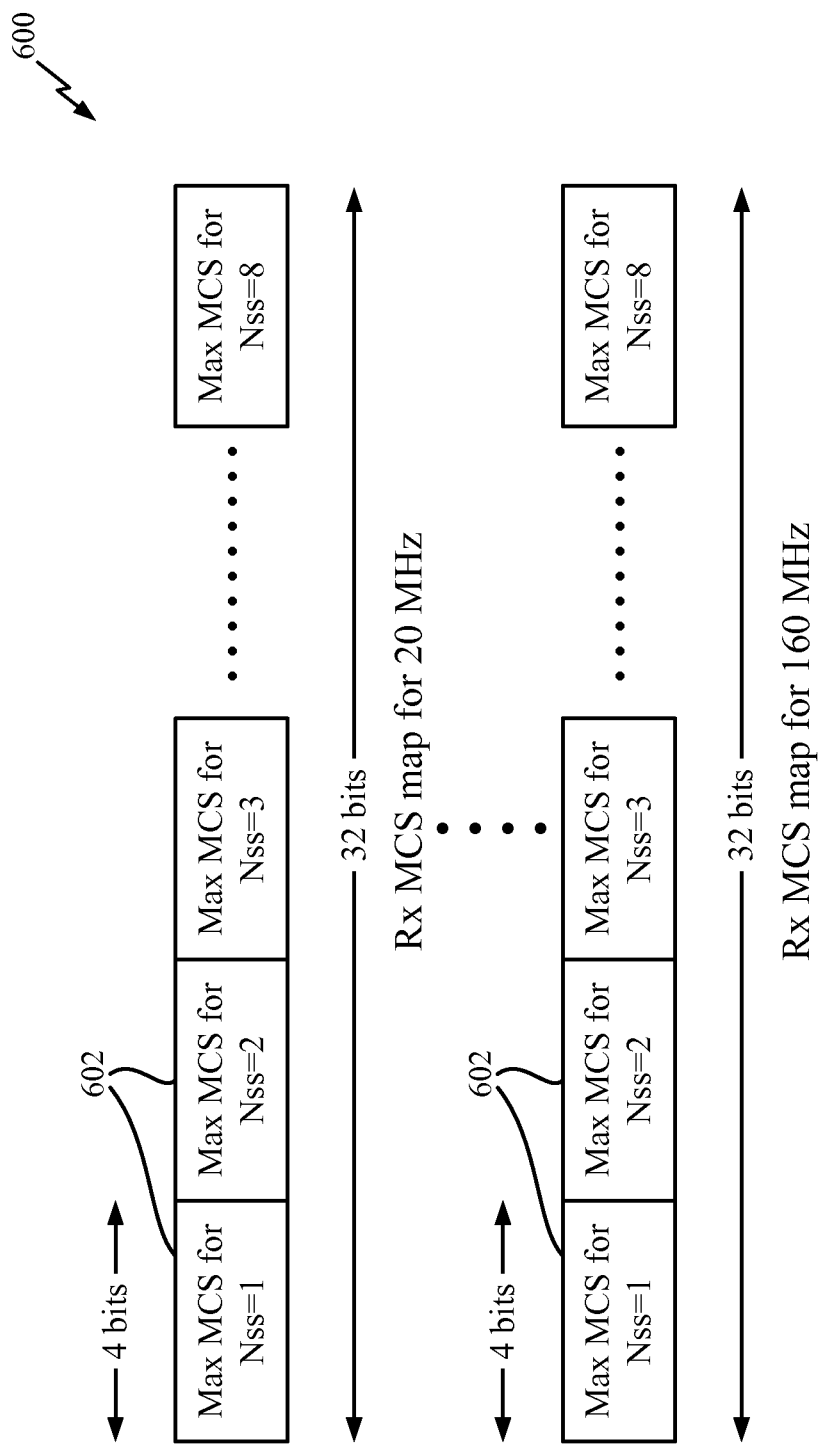
FIG. 6 illustrates an example receiving MCS map for a plurality of bandwidths in accordance with certain aspects of the present disclosure.

FIG. 6 illustrates an example format 600 of Rx MCS map for a plurality of bandwidths in accordance with certain aspects of the present disclosure. In an aspect, the plurality of bandwidths may comprise at least one of a bandwidth of 20 MHz, a bandwidth of 40 MHz, a bandwidth of 80 MHz, or a bandwidth of 160 MHz. The Rx MCS Map 600 may comprise a 128 bit field, wherein 32 bits may be dedicated for each bandwidth (e.g., 20 MHz, 40 MHz, 80 MHz and 160 MHz), which may specify a maximum MCS supported for every number of spatial streams (Nss) received at a STA transmitting the Rx MCS map 600.

A 4-bit number 602 may be between 0 and 9 for each Nss value for each bandwidth. In an aspect, binary value of '1111' in one the fields 602 may denote no support for that Nss. If MCS number n is supported for a given Nss value, then all MCS's m smaller than or equal to the value of n may be also supported for that Nss, if the value of m is not a restricted MCS for that Nss.

The VHT supported MCS field may further comprise a transmitter (Tx) MCS Set Defined bit. This bit may specify whether the transmitting STA is advertising its transmitting MCS capability or not. In an aspect, subsequent fields may be irrelevant if this bit is set to zero. When this bit is set to one, the subsequent fields may help the STA in choosing a more powerful AP or an AP more commensurate with STA's own capability.

A Tx MCS map may follow the Tx MCS Set Defined bit. In an aspect of the present disclosure, the Tx MCS Map may be identical to the Rx MCS map 600 illustrated in FIG. 6.

Figure 7:
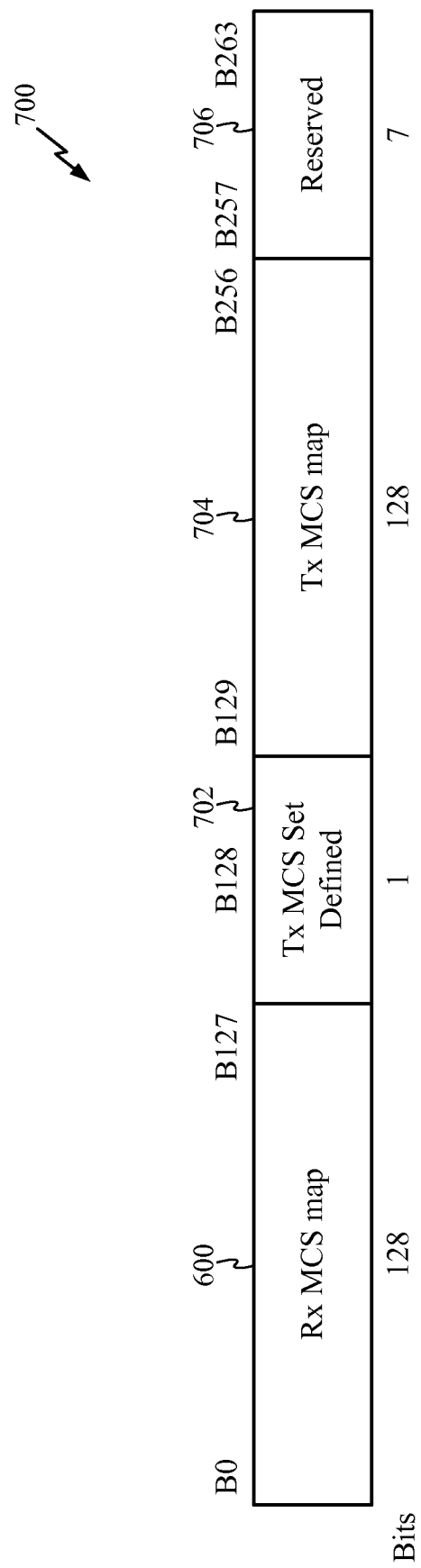
FIG. 7 illustrates another example frame format for VHT supported MCS in accordance with certain aspects of the present disclosure.

FIG. 7 illustrates an example frame format 700 for VHT supported MCS in accordance with certain aspects of the present disclosure. As aforementioned, the frame 700 may comprise at least one of the Rx MCS map 600 from FIG. 6, the Tx MCS Set Defined bit 702, the Tx MCS Map field 704, or reserved bits 706.

Figure 8A:
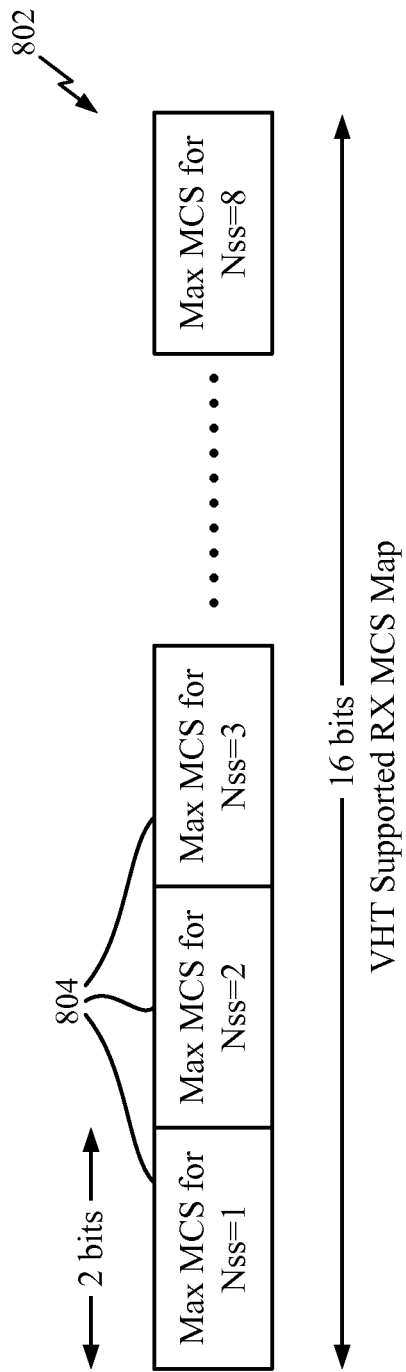
FIGS. 8A-8C illustrate examples of VHT supported MCS set subfields in accordance with certain aspects of the present disclosure.

FIG. 8A illustrates an example 802 of VHT supported Rx MCS map in accordance with certain aspects of the present disclosure. The Rx MCS map 802 may indicate the maximum MCS that can be received for each number of spatial streams. In an aspect, a two-bit "Max MCS for n SS" subfield 804 for each number of spatial streams n=1, ... , 8 may be encoded as follows. The value of zero of the subfield 804 may indicate support for MCS between 0 and 7, and the value of one of the subfield 804 may indicate support for MCS between 0 and 8. Further, the value of two of the subfield 804 may indicate support for MCS between 0 and 9, and the value of three of the subfield 804 may indicate that n spatial streams is not supported. It should be noted that some MCSs might not be valid for particular bandwidth and number of spatial steams combinations.

Figure 8B:
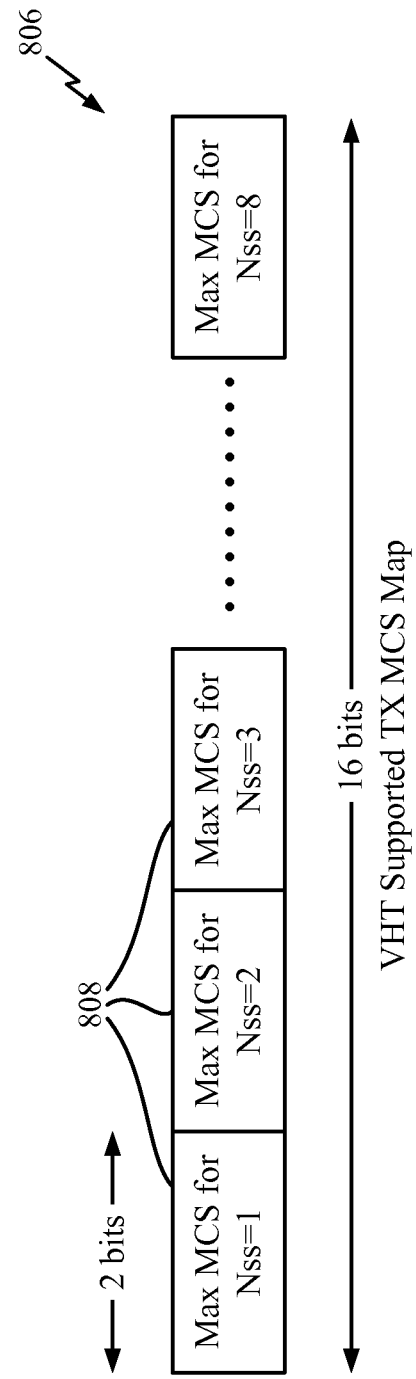

FIG. 8B illustrates an example 806 of VHT supported Tx MCS map in accordance with certain aspects of the present disclosure. The Tx MCS map 806 may indicate the maximum MCS that can be transmitted for each number of spatial streams. In an aspect, a two-bit "Max MCS for n SS" subfield 808 for each number of spatial streams n=1, ... , 8 may be encoded as follows. The value of zero of the subfield 808 may indicate support for MCS between 0 and 7, and the value of one of the subfield 808 may indicate support for MCS between 0 and 8. Further, the value of two of the subfield 808 may indicate support for MCS between 0 and 9, and the value of three of the subfield 808 may indicate that n spatial streams is not supported. It should be noted that some MCSs might not be valid for particular bandwidth and number of spatial steams combinations.

Figure 8C:
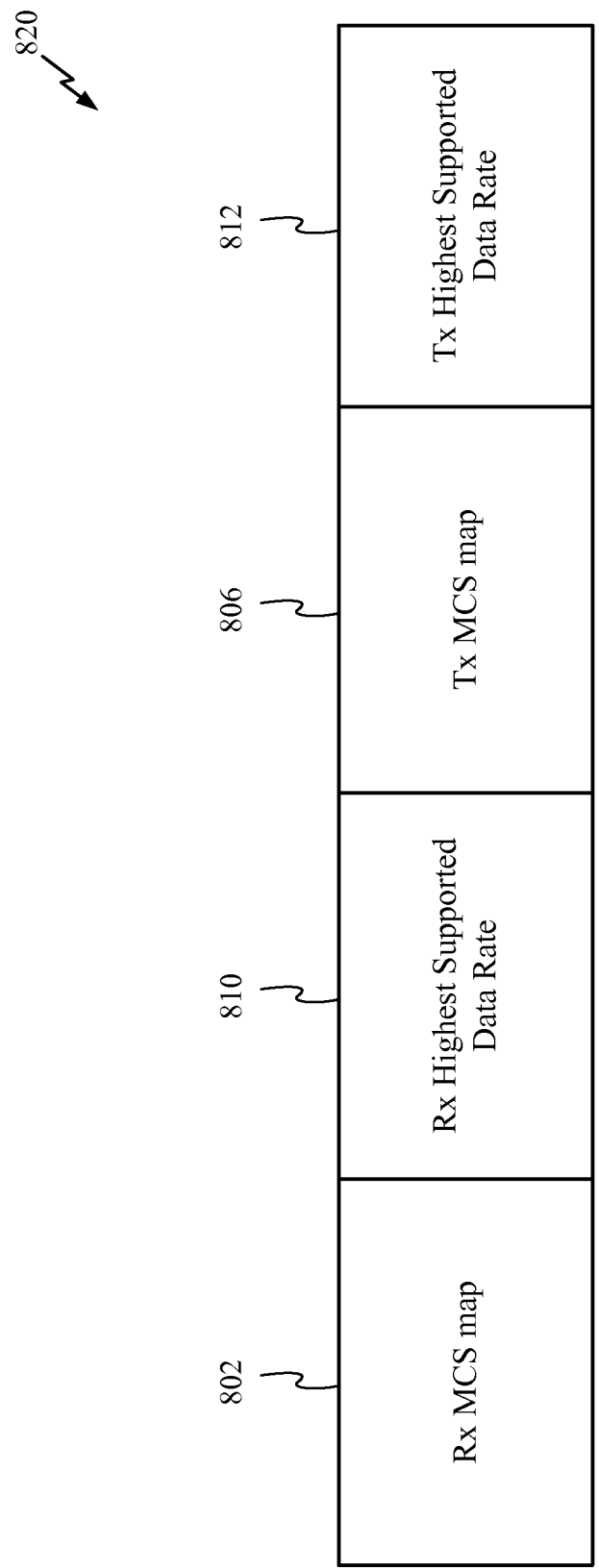

FIG. 8C illustrates an example frame 820 for VHT supported MCS subfields in accordance with certain aspects of the present disclosure. The frame 820 may comprise at least one of the Rx MCS map 802 from FIG. 8A, an "Rx Highest Supported Rate" subfield 810, the Tx MCS map 806 from FIG. 8C, or a "Tx Highest Supported Rate" subfield 812. In an aspect of the present disclosure, the subfield 810 may indicate the maximum data rate that a STA can receive and the subfield 812 may indicate the maximum data rate that the STA will transmit. The maximum data rates (i.e., transmit and receive data rates) may be indicated in units of Mb/s, where the value of 1 represents 1 Mb/s and incrementing is in steps of 1 Mb/s. If the maximum data rate expressed in Mb/s is not an integer, then the value may be rounded up to the next integer.

Figure 9:
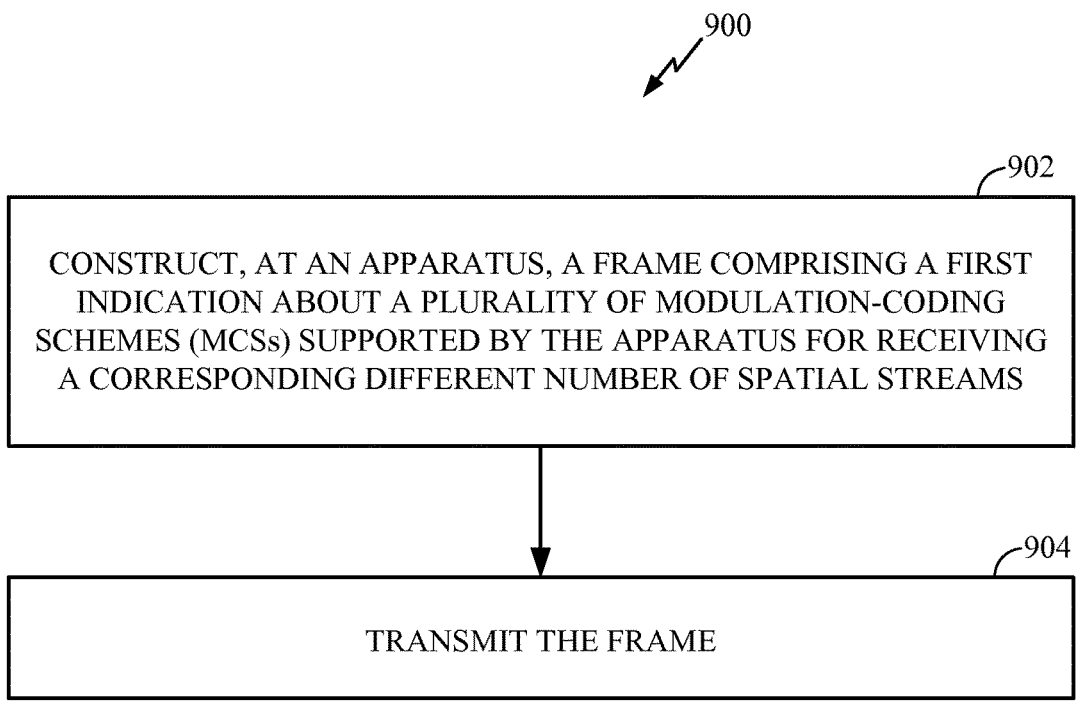
FIG. 9 illustrates example operations for constructing a frame for VHT supported MCS in accordance with certain aspects of the present disclosure.
Figure 9A:
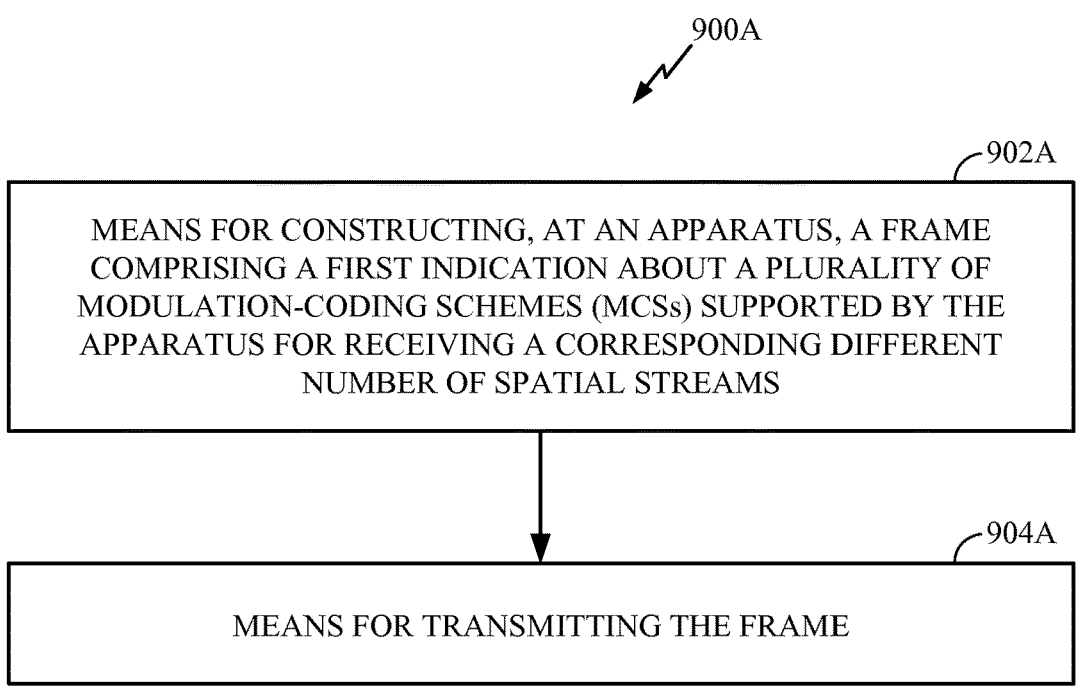
FIG. 9A illustrates example components capable of performing the operations of FIG. 9.

FIG. 9 illustrates example operations 900 for constructing a frame for VHT supported MCS (e.g., the frame 500 illustrated in FIG. 5, or the frame 820 illustrated in FIG. 8C) in accordance with certain aspects of the present disclosure. The operations 900 may be performed by a wireless communication apparatus (e.g., a wireless node). At 902, the frame may be constructed, wherein the frame may comprise a first indication about a plurality of modulation-coding schemes (MCSs) supported by the apparatus for receiving a corresponding different number of spatial streams (SSs). At 904, the apparatus may transmit the constructed frame.

In an aspect, the frame may further comprise a second indication about a highest data rate supported by the apparatus for reception. Also, the frame may further comprise at least one of: a field specifying whether the apparatus advertises its transmitting MCS capability, a third indication about a plurality of MCSs supported by the apparatus for transmitting a corresponding different number of SSs, or a fourth indication about a highest data rate supported for transmission by the apparatus. In one aspect, the first indication may denote no support for receiving that corresponding number of SSs, if the first indication comprises a specific value. According to certain aspects of the present disclosure, the frame may be transmitted in accordance with IEEE 802.11 family of wireless communications standards.

In an aspect, the first indication may comprise a value that represents a highest MCS among the one or more MCSs, wherein the value may be associated with a plurality of bandwidths. In another aspect, the first indication may comprise a value for each of a plurality of bandwidths, and the value may represent a highest MCS among the MCSs supported for reception by the apparatus for that bandwidth. The plurality of bandwidths may comprise at least one of a bandwidth of 20 MHz, a bandwidth of 40 MHz, a bandwidth of 80 MHz, or a bandwidth of 160 MHz.

Figure 10:
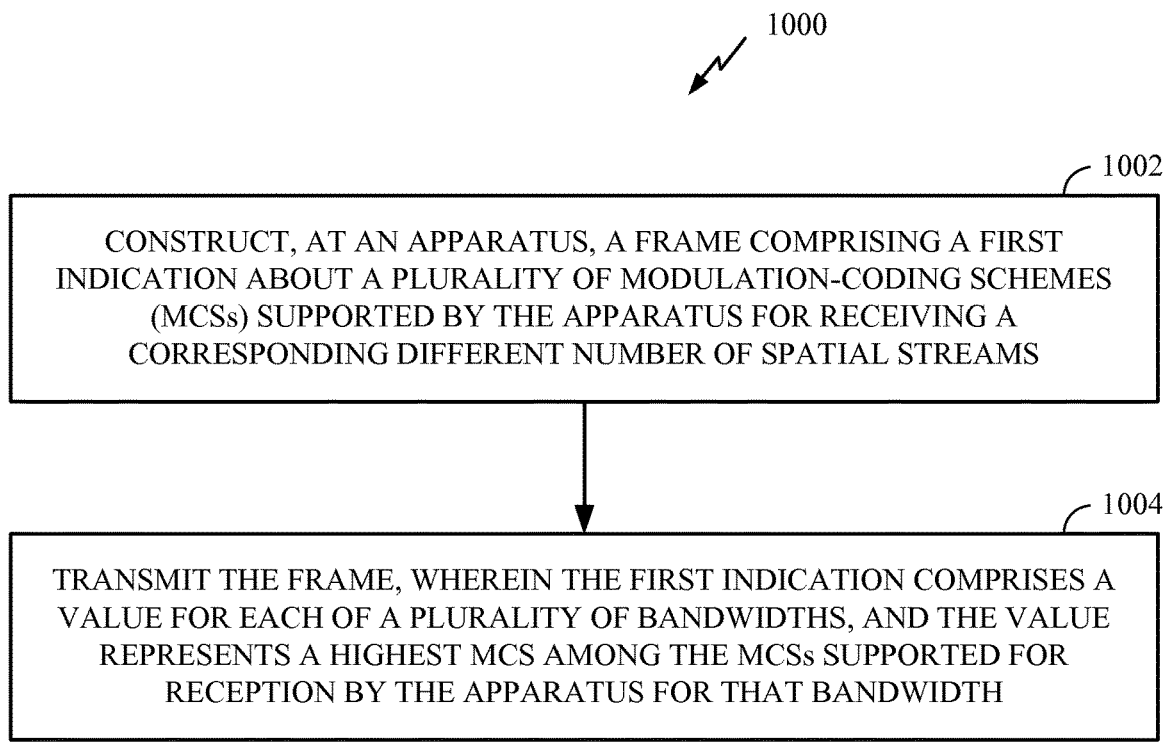
FIG. 10 illustrates other example operations for constructing a frame for VHT supported MCS in accordance with certain aspects of the present disclosure.
Figure 10A:
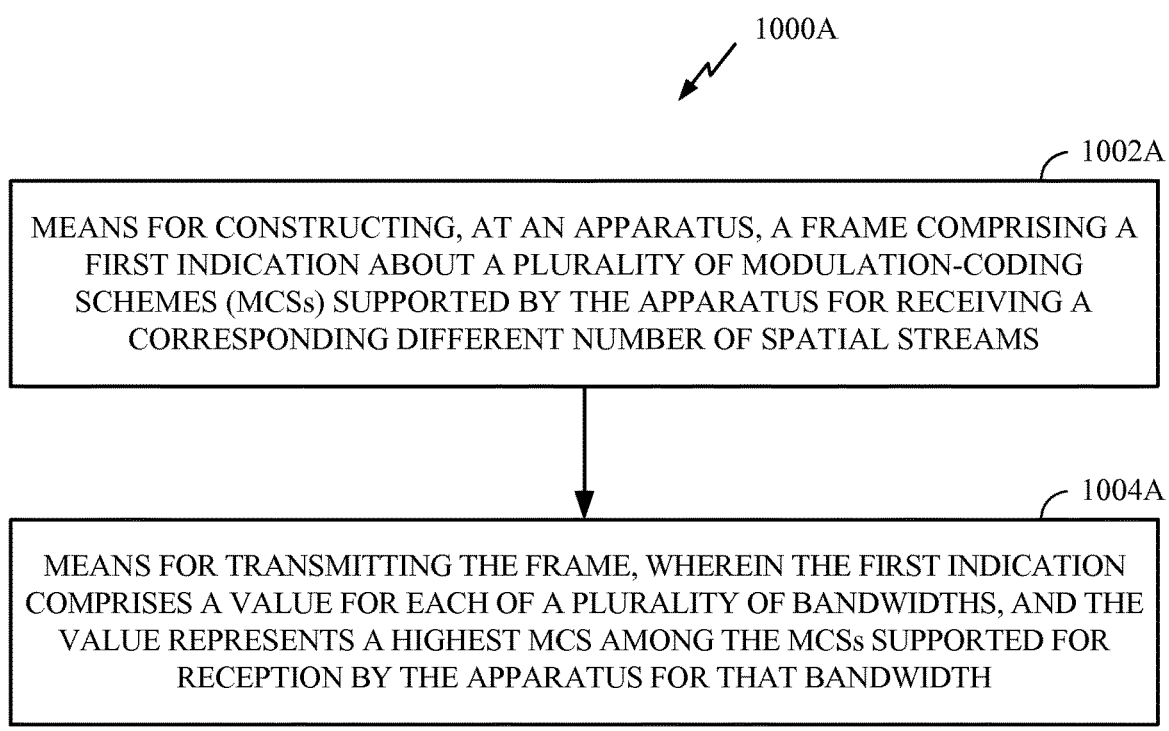
FIG. 10A illustrates example components capable of performing the operations of FIG. 10.

FIG. 10 illustrates example operations 1000 for constructing a frame for VHT supported MCS (e.g., the frame 700 illustrated in FIG. 7, or the frame 820 illustrated in FIG. 8C) in accordance with certain aspects of the present disclosure. The operations 1000 may be performed by a wireless communication apparatus (e.g., a wireless node). At 1002, the frame may be constructed, wherein the frame may comprise a first indication about a plurality of MCSs supported by the apparatus for receiving a corresponding different number of SSs, and wherein the first indication may comprise a value for each of a plurality of bandwidths, and the value may represent a highest MCS among the MCSs supported for reception by the apparatus for that bandwidth. At 1004, the apparatus may transmit the constructed frame.

According to certain aspects of the present disclosure, the plurality of bandwidths may comprise at least one of a bandwidth of 20 MHz, a bandwidth of 40 MHz, a bandwidth of 80 MHz, or a bandwidth of 160 MHz. The frame may be transmitted in accordance with IEEE 802.11 family of wireless communications standards.

In one aspect, the frame may further comprise a field specifying whether the apparatus advertises its transmitting MCS capability, and a second indication about a plurality of MCSs supported by the apparatus for transmitting a corresponding different number of SSs. The second indication may comprise a value for each of a plurality of bandwidths, and the value may represent a highest MCS among the MCSs supported for transmission by the apparatus for that bandwidth. In an aspect, the first indication may denote no support for receiving that corresponding number of SSs, if the first indication comprises a specific value.

Figure 11:
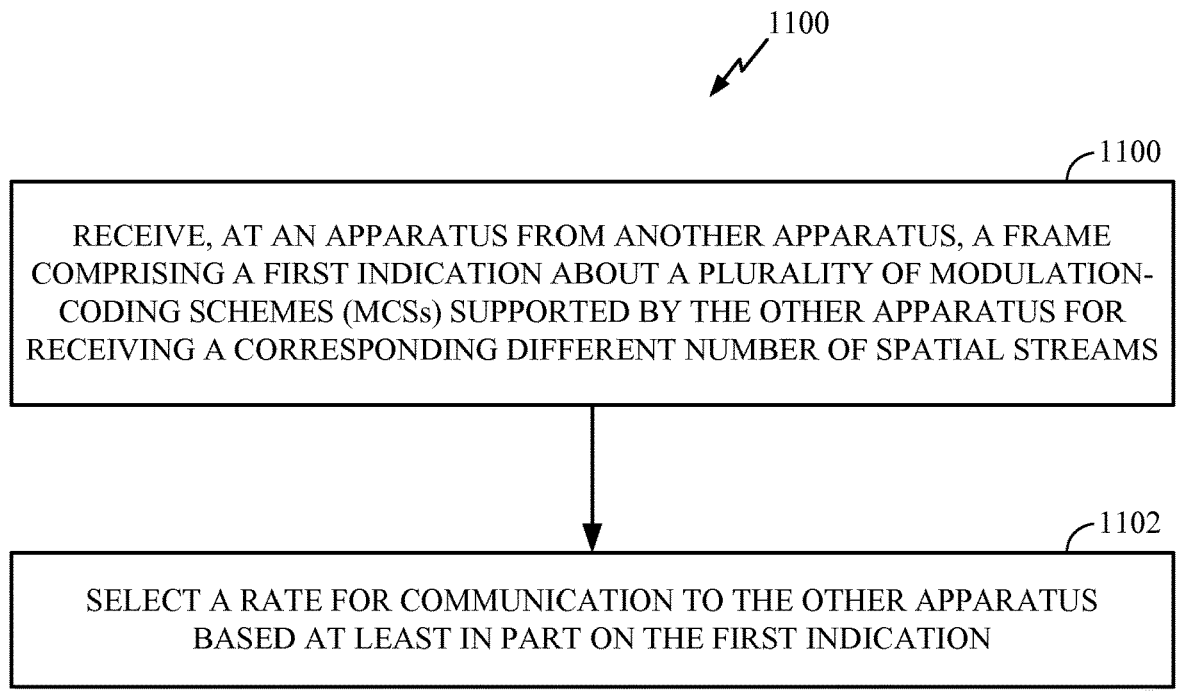
FIG. 11 illustrates example operations for receiving a frame for VHT supported MCS in accordance with certain aspects of the present disclosure.
Figure 11A:
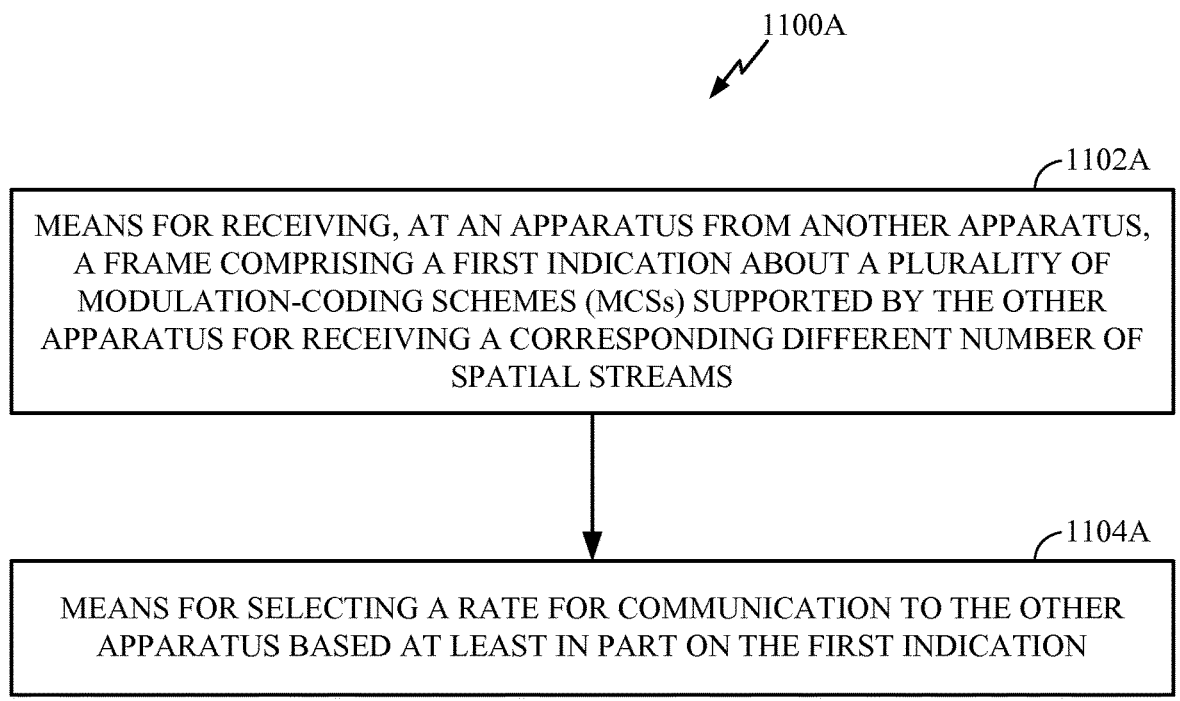
FIG. 11A illustrates example components capable of performing the operations of FIG. 11.

FIG. 11 illustrates example operations 1100 for receiving a frame for VHT supported MCS (e.g., the frame 500 illustrated in FIG. 5, or the frame 820 illustrated in FIG. 8C) in accordance with certain aspects of the present disclosure. The operations 1100 may be performed by a wireless communication apparatus (e.g., a wireless node). At 1102, the apparatus may receive, from another apparatus, the frame comprising a first indication about a plurality of MCSs supported by the other apparatus for receiving a corresponding different number of SSs. At 1104, the apparatus may select a rate for communication to the other apparatus based at least in part on the first indication. In an aspect, the apparatus may transmit data to the other apparatus according to the rate.

In an aspect, the frame may further comprise a second indication about a highest data rate supported by the other apparatus for reception. Also, the frame may further comprise at least one of: a field specifying whether the other apparatus advertises its transmitting MCS capability, a third indication about a plurality of MCSs supported by the other apparatus for transmitting a corresponding different number of SSs, or a fourth indication about a highest data rate supported for transmission by the other apparatus. In one aspect, the apparatus may ignore the third indication, of the field is set to a specific value (e.g., zero).

In an aspect, the apparatus may select a communicating apparatus among the other apparatus and one or more apparatuses based at least in part on the third indication. The apparatus may be then scheduled to receive data from the selected communicating apparatus.

In an aspect, the selected communicating apparatus may be the one with a highest available transmit power among the other apparatus and the one or more apparatuses. In another aspect, the selected communicating apparatus may comprise transmitting capability that is the most commensurate with receiving capability of the apparatus among the other apparatus and the one or more apparatuses.

Figure 12:
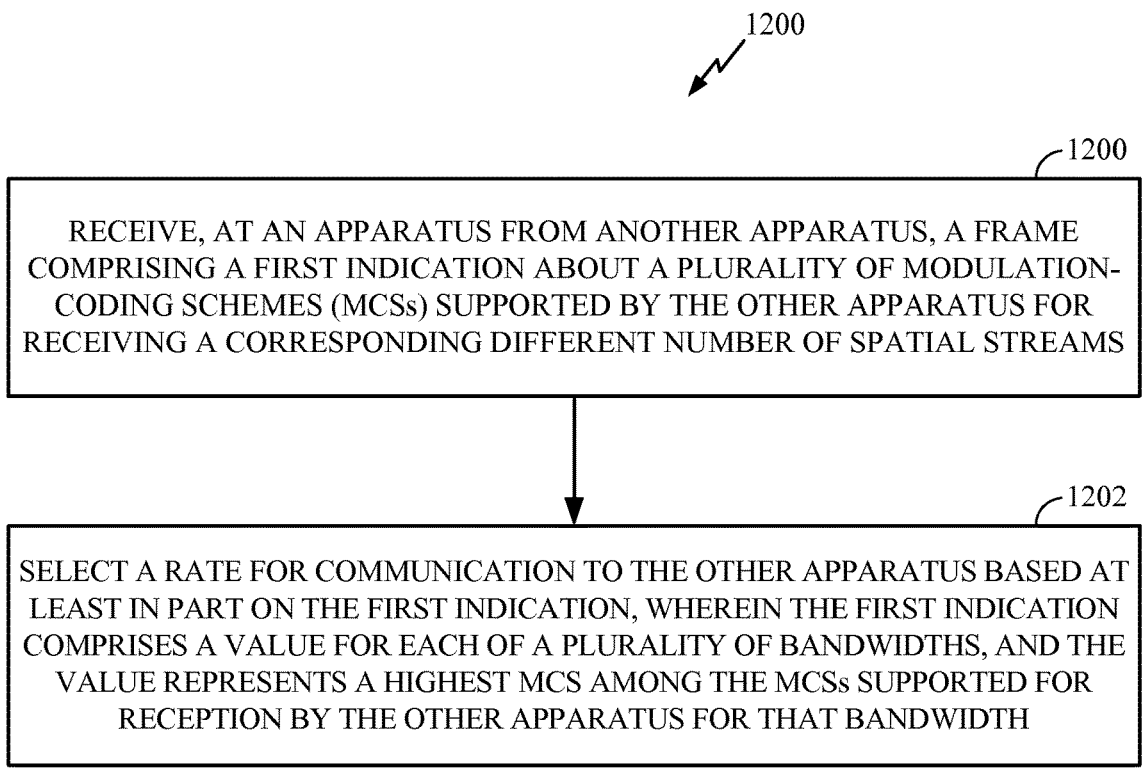
FIG. 12 illustrates other example operations for receiving a frame for VHT supported MCS in accordance with certain aspects of the present disclosure.
Figure 12A:
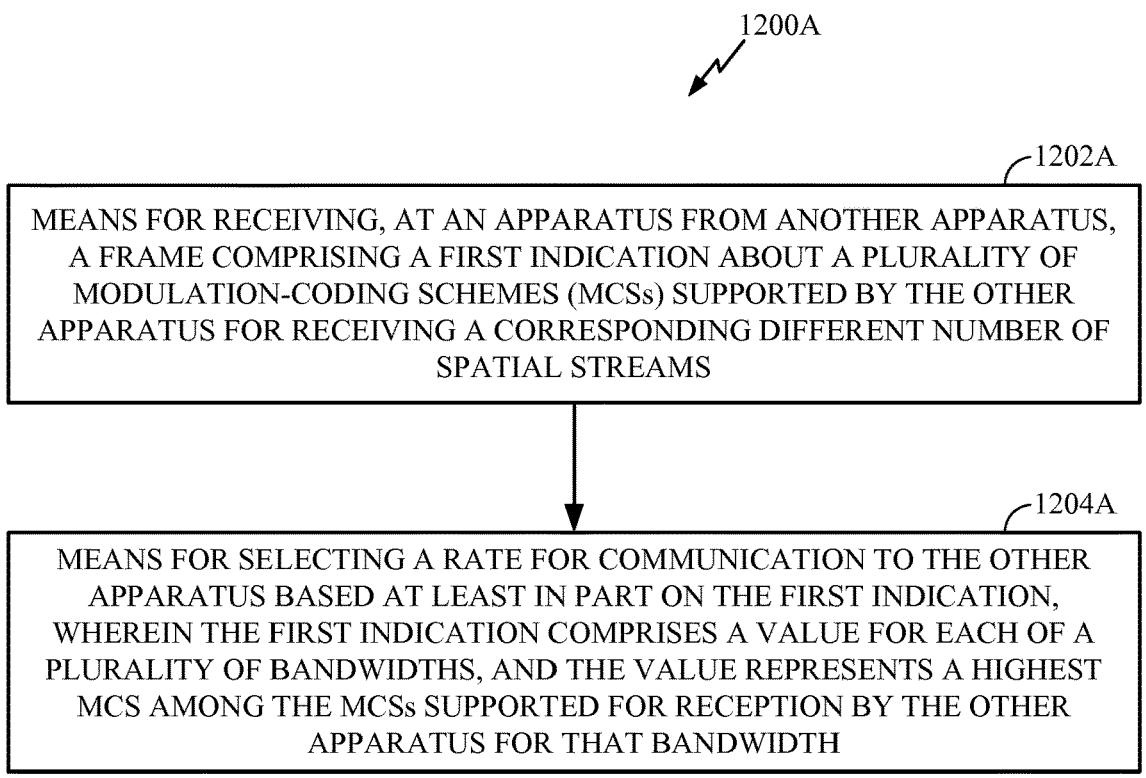
FIG. 12A illustrates example components capable of performing the operations of FIG. 12.

FIG. 12 illustrates example operations 1200 for receiving a frame for VHT supported MCS (e.g., the frame 700 illustrated in FIG. 7, or the frame 820 illustrated in FIG. 8C) in accordance with certain aspects of the present disclosure. The operations 1200 may be performed by a wireless communication apparatus (e.g., a wireless node). At 1202, the apparatus may receive, from another apparatus, the frame comprising a first indication about a plurality of MCSs supported by the other apparatus for receiving a corresponding different number of SSs, wherein the first indication may comprise a value for each of a plurality of bandwidths, and the value may represent a highest MCS among the MCSs supported for reception by the other apparatus for that bandwidth. At 1204, the apparatus may select a rate for communication to the other apparatus based at least in part on the first indication. In an aspect, the apparatus may transmit data to the other apparatus according to the rate.

According to certain aspects of the present disclosure, the frame may further comprise at least one of a field specifying whether the other apparatus advertises its transmitting MCS capability, or a second indication about a plurality of MCSs supported by the other apparatus for transmitting a corresponding different number of SSs. In one aspect, the apparatus may select a communicating apparatus among the other apparatus and one or more apparatuses based at least in part on the second indication. Then, the apparatus may receive data from the selected communicating apparatus. The selected communicating apparatus may be with a highest available transmit power among the other apparatus and the one or more apparatuses. Further, the selected communicating apparatus may comprise transmitting capability that is the most commensurate with receiving capability of the apparatus among the other apparatus and the one or more apparatuses.

In an aspect of the present disclosure, the apparatus may ignore the second indication, if the field is set to a specific value (e.g., zero). In another aspect, the second indication may comprise a value for each of a plurality of bandwidths, and the value may represent a highest MCS among the MCSs supported for transmission by the other apparatus for that bandwidth.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components with similar numbering. For example, operations 900, 1000, 1100 and 1200 illustrated in FIGS. 9, 10, 11 and 12 correspond to components 900A, 1000A, 1100A and 1200A illustrated in FIGS. 9A, 10A, 11A and 12A.

For example, the means for constructing may comprise an application specific integrated circuit, e.g., the TX data processor 210 from FIG. 2 of the access point 110 or the processor 304 of the wireless device 302 from FIG. 3. The means for transmitting may comprise a transmitter, e.g., the transmitter 222 from FIG. 2 of the access point 110, the transmitter 254 from FIG. 2 of the user terminal 120, or the transmitter 310 of the wireless device 302. The means for receiving may comprise a receiver, e.g., the receiver 254 from FIG. 2 of the user terminal 120, or the receiver 312 of the wireless device 302. The means for selecting may comprise an application specific integrated circuit, e.g., the RX data processor 270 from FIG. 2 of the user terminal 120 or the processor 304 of the wireless device 302. The means for ignoring may comprise an application specific integrated circuit, e.g., the RX data processor 270 of the user terminal 120 or the processor 304 of the wireless device 302.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

The invention claimed is:

1. A method for wireless communications performed by an apparatus, comprising:
  receiving, from a second apparatus, a frame comprising a first field comprising a first plurality of subfields, wherein:
    each subfield of the first plurality of subfields is associated with receiving a different respective number of spatial streams, and
    each subfield of the first plurality of subfields comprises bits indicating a maximum modulation and coding scheme (MCS) supported by the second apparatus for receiving the respective number of spatial streams associated with the respective subfield;
  selecting an MCS for communication to the second apparatus based at least in part on the first field; and
  transmitting data to the second apparatus according to the selected MCS.

2. The method of claim 1, wherein the frame further comprises a second field indicating a highest data rate supported by the second apparatus for reception.

3. The method of claim 1, wherein the frame further comprises a second field comprising a second plurality of subfields, wherein:
  each subfield of the second plurality of subfields is associated with transmitting a different respective number of spatial streams, and
  each subfield of the second plurality of subfields comprises bits indicating a maximum modulation and coding scheme (MCS) supported for transmitting the respective number of spatial streams associated with the respective subfield.

4. The method of claim 3, further comprising: selecting a communicating apparatus among the second apparatus and one or more other apparatuses based at least in part on the second field.

5. The method of claim 4, further comprising: receiving data from the selected communicating apparatus.

6. The method of claim 4, further including determining which apparatus among the second apparatus and the one or more other apparatuses has the highest available transmit power, wherein the selecting is based on the determination.

7. The method of claim 4, further including determining which apparatus among the second apparatus and the one or more other apparatuses has a transmitting capability that is the most commensurate with a receiving capability of the apparatus.

8. The method of claim 3, wherein the frame further comprises a third field specifying whether the second apparatus advertises its transmitting MCS capability, and wherein the method further includes ignoring the second field responsive to determining that the third field is set to a particular value.

9. The method of claim 1, wherein the frame further includes a second field about a highest data rate supported for transmission by the second apparatus.

10. An apparatus for wireless communications, comprising:
  means for receiving, from a second apparatus, a frame comprising a first field comprising a first plurality of subfields, wherein:
    each subfield of the first plurality of subfields is associated with receiving a different respective number of spatial streams, and
    each subfield of the first plurality of subfields comprises bits indicating a maximum modulation and coding scheme (MCS) supported by the second apparatus for receiving the respective number of spatial streams associated with the respective subfield;
  means for selecting an MCS for communication to the second apparatus based at least in part on the first field; and
  means for transmitting data to the second apparatus according to the selected MCS.

11. The apparatus of claim 10, wherein the frame further comprises a second field indicating a highest data rate supported by the second apparatus for reception.

12. The apparatus of claim 10, wherein the frame further comprises a second field comprising a second plurality of subfields, wherein:
  each subfield of the second plurality of subfields is associated with transmitting a different respective number of spatial streams, and
  each subfield of the second plurality of subfields comprises bits indicating a maximum modulation and coding scheme (MCS) supported for transmitting the respective number of spatial streams associated with the respective subfield.

13. The apparatus of claim 12, further comprising: means for selecting a communicating apparatus among the second apparatus and one or more other apparatuses based at least in part on the second field.

14. The apparatus of claim 13, wherein the means for receiving is further configured to: receive data from the selected communicating apparatus.

15. The apparatus of claim 13, further comprising means for determining which apparatus among the second apparatus and the one or more other apparatuses has the highest available transmit power, wherein the selecting is based on the determination.

16. The apparatus of claim 13, further comprising means for determining which apparatus among the second apparatus and the one or more other apparatuses has a transmitting capability that is the most commensurate with a receiving capability of the apparatus.

17. The apparatus of claim 12, wherein the frame further comprises a third field specifying whether the second apparatus advertises its transmitting MCS capability, and wherein the apparatus further comprises means for ignoring the second field responsive to determining that the third field is set to a particular value.

18. The apparatus of claim 10, wherein the frame further includes a second field about a highest data rate supported for transmission by the second apparatus.

19. An apparatus for wireless communications, comprising:
a receiver configured to receive, from a second apparatus, a frame comprising a first field comprising a first plurality of subfields, wherein:
each subfield of the first plurality of subfields is associated with receiving a different respective number of spatial streams, and
each subfield of the first plurality of subfields comprises bits indicating a maximum modulation and coding scheme (MCS) supported by the second apparatus for receiving the respective number of spatial streams associated with the respective subfield;
a circuit configured to select an MCS for communication to the second apparatus based at least in part on the first field; and
a transmitter configured to transmit data to the second apparatus according to the selected MCS.

20. A non-transitory computer readable medium containing executable instructions for wireless communications, the executable instructions comprising instructions for causing an apparatus to:
receive, from a second apparatus, a frame comprising a first field comprising a first plurality of subfields, wherein:
each subfield of the first plurality of subfields is associated with receiving a different respective number of spatial streams, and
each subfield of the first plurality of subfields comprises bits indicating a maximum modulation and coding scheme (MCS) supported by the second apparatus for receiving the respective number of spatial streams associated with the respective subfield;
select an MCS for communication to the second apparatus based at least in part on the first field; and
transmit data to the second apparatus according to the selected MCS.

21. A method for wireless communications performed by an apparatus, comprising:
receiving, from a second apparatus, a frame comprising a first field comprising a first plurality of subfields, wherein:
each subfield of the first plurality of subfields is associated with receiving a different respective number of spatial streams at one bandwidth of a plurality of bandwidths, and
each subfield of the first plurality of subfields comprises bits indicating a maximum modulation and coding scheme (MCS) supported by the second apparatus for receiving the respective number of spatial streams associated with the respective subfield at the one bandwidth of the plurality of bandwidths;
selecting an MCS for communication to the second apparatus based at least in part on the first field; and
transmitting data to the second apparatus according to the selected MCS.

22. The method of claim 21, wherein the plurality of bandwidths comprises at least one of: a bandwidth of 20 MHz, a bandwidth of 40 MHz, a bandwidth of 80 MHz, or a bandwidth of 160 MHz.

23. The method of claim 21, wherein the frame further comprises a second field comprising a second plurality of subfields, wherein:
each subfield of the second plurality of subfields is associated with transmitting a different respective number of spatial streams at one bandwidth of the plurality of bandwidths, and
each subfield of the second plurality of subfields comprises bits indicating a maximum modulation and coding scheme (MCS) supported for transmitting the respective number of spatial streams associated with the respective subfield at the one bandwidth of the plurality of bandwidths.

24. The method of claim 23, further comprising: selecting a communicating apparatus among the second apparatus and one or more other apparatuses based at least in part on the second field.

25. The method of claim 24, further comprising: receiving data from the selected communicating apparatus.

26. The method of claim 24, further including determining which apparatus among the second apparatus and the one or more other apparatuses has the highest available transmit power, wherein the selecting is based on the determination.

27. The method of claim 24, further including determining which apparatus among the second apparatus and the one or more other apparatuses has a transmitting capability that is the most commensurate with a receiving capability of the apparatus.

28. The method of claim 23, wherein the frame further comprises a third field specifying whether the second apparatus advertises its transmitting MCS capability, and wherein the method further includes ignoring the second field responsive to determining that the third field is set to a particular value.

29. The method of claim 21, wherein the frame further comprises a second field indicating a highest data rate supported by the second apparatus for reception.

30. The method of claim 21, wherein the frame further includes a second field about a highest data rate supported for transmission by the second apparatus.

31. An apparatus for wireless communications, comprising:
means for receiving, from a second apparatus, a frame comprising a first field comprising a first plurality of subfields, wherein:
each subfield of the first plurality of subfields is associated with receiving a different respective number of spatial streams at one bandwidth of a plurality of bandwidths, and
each subfield of the first plurality of subfields comprises bits indicating a maximum modulation and coding scheme (MCS) supported by the second apparatus for receiving the respective number of spatial streams associated with the respective subfield at the one bandwidth of the plurality of bandwidths;
means for selecting an MCS for communication to the second apparatus based at least in part on the first field; and
means for transmitting data to the second apparatus according to the selected MCS.

32. The apparatus of claim 31, wherein the plurality of bandwidths comprises at least one of: a bandwidth of 20 MHz, a bandwidth of 40 MHz, a bandwidth of 80 MHz, or a bandwidth of 160 MHz.

33. The apparatus of claim 31, wherein the frame further comprises a second field comprising a second plurality of subfields, wherein:
   each subfield of the second plurality of subfields is associated with transmitting a different respective number of spatial streams at one bandwidth of the plurality of bandwidths, and
   each subfield of the second plurality of subfields comprises bits indicating a maximum modulation and coding scheme (MCS) supported for transmitting the respective number of spatial streams associated with the respective subfield at the one bandwidth of the plurality of bandwidths.

34. The apparatus of claim 33, further comprising: means for selecting a communicating apparatus among the second apparatus and one or more other apparatuses based at least in part on the second field.

35. The apparatus of claim 34, wherein the means for receiving is further configured to: receive data from the selected communicating apparatus.

36. The apparatus of claim 34, further including means for determining which apparatus among the second apparatus and the one or more other apparatuses has the highest available transmit power, wherein the selecting is based on the determination.

37. The apparatus of claim 34, further including means for determining which apparatus among the second apparatus and the one or more other apparatuses has a transmitting capability that is the most commensurate with a receiving capability of the apparatus.

38. The apparatus of claim 33, wherein the frame further comprises a third field specifying whether the second apparatus advertises its transmitting MCS capability, and further comprising means for ignoring the second field responsive to determining that the third field is set to a particular value.

39. The apparatus of claim 31, wherein the frame further comprises a second field indicating a highest data rate supported by the second apparatus for reception.

40. The apparatus of claim 31, wherein the frame further includes a second field about a highest data rate supported for transmission by the second apparatus.

41. An apparatus for wireless communications, comprising:
   a receiver configured to receive, from second apparatus, a frame comprising a first field comprising a first plurality of subfields, wherein:
      each subfield of the first plurality of subfields is associated with receiving a different respective number of spatial streams at one bandwidth of a plurality of bandwidths, and
      each subfield of the first plurality of subfields comprises bits indicating a maximum modulation and coding scheme (MCS) supported by the second apparatus for receiving the respective number of spatial streams associated with the respective subfield at the one bandwidth of the plurality of bandwidths;
   a circuit configured to select an MCS for communication to the second apparatus based at least in part on the first field; and
   a transmitter configured to transmit data to the second apparatus according to the selected MCS.

42. A non-transitory computer readable medium containing executable instructions for wireless communications, the executable instructions comprising instructions for causing an apparatus to:
   receive, from a second apparatus, a frame comprising a first field comprising a first plurality of subfields, wherein:
      each subfield of the first plurality of subfields is associated with receiving a different respective number of spatial streams at one bandwidth of a plurality of bandwidths, and
      each subfield of the first plurality of subfields comprises bits indicating a maximum modulation and coding scheme (MCS) supported by the second apparatus for receiving the respective number of spatial streams associated with the respective subfield at the one bandwidth of the plurality of bandwidths;
   select an MCS for communication to the second apparatus based at least in part on the first field; and
   transmit data to the second apparatus according to the selected MCS.

* * * * *